UNITED STATES PATENT OFFICE.

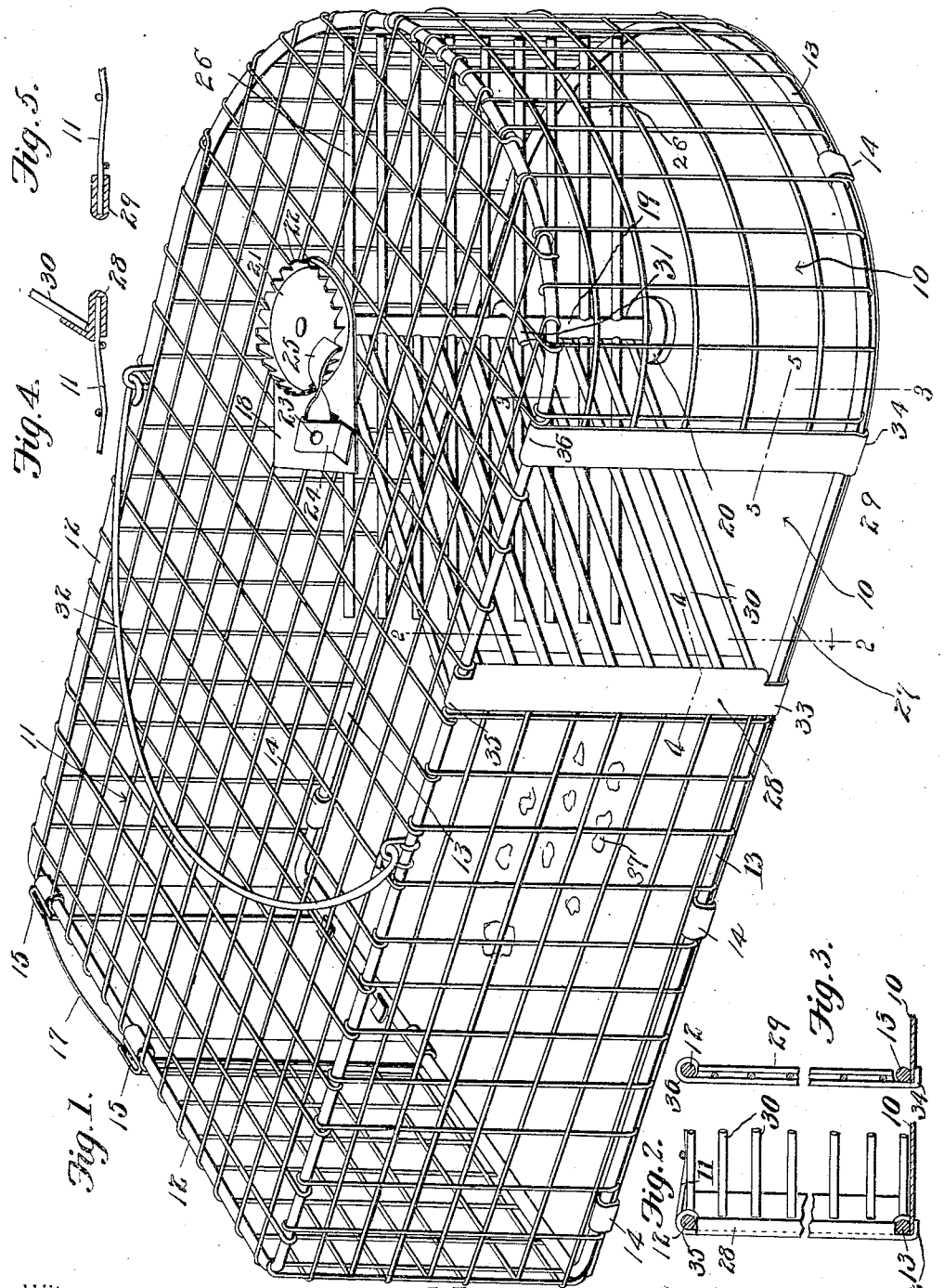

JOHN A. MATHEWSON, OF SAN JOSE, CALIFORNIA.

TRAP.

No. 832,142.        Specification of Letters Patent.        Patented Oct. 2, 1906.

Application filed December 16, 1905. Serial No. 292,098.

*To all whom it may concern:*

Be it known that I, JOHN A. MATHEWSON, a citizen of the United States, residing at San Jose, in the county of Santa Clara and State of California, have invented a new and useful Trap, of which the following is a specification.

This invention relates to animal-traps, and has for its object to improve the construction and increase the efficiency of devices of this character.

With these and other objects in view, which will appear as the nature of the invention is better understood, the same consists in certain novel features of construction, as hereinafter fully described and claimed.

In the accompanying drawings, forming a part of this specification, and in which corresponding parts are denoted by like designating characters, is illustrated the preferred form of embodiment of the invention capable of carrying the same into practical operation.

In the drawings, Figure 1 is a perspective view of the improved trap. Fig. 2 is a sectional detail on the line 2 2 of Fig. 1. Fig. 3 is a sectional detail on the line 3 3 of Fig. 1. Fig. 4 is a sectional detail on the line 4 4 of Fig. 1. Fig. 5 is a sectional detail on the line 5 5 of Fig. 1.

The improved device comprises a cage of any desired form, but preferably oblong and with an imperforate bottom 10 and wire-netting sides, ends and top 11 and with a portion of one wall curved, preferably, in semicircular shape at one end, as shown.

At the juncture of the side and end walls with the top and bottom portions the structure is reinforced with heavy wire frames 12 13, the lower frame 13 being coupled to the bottom 10 by spaced clips 14. A doorway-opening is formed at one end and provided with guideways 15 at each side of the opening to receive a door 17, through which the caught animals are removed. Supported upon the upper side of the cage is a plate 18, and journaled at one end through this plate is a shaft 19, the lower end of the shaft being journaled in a step 20 on the bottom 10 of the cage and concentric to the rounded end of the same. Connected to the upper end of the shaft 19, above the plate 18, is a disk 21, having an upturned flange at the rim provided with spaced teeth 22. Pivoted at 23 in a standard 24, rising from the plate 18, is a gravity-pawl 25, engaging the teeth 22 and preventing the rotation of the same in one direction, while permitting free rotation in the opposite direction. Connected to the shaft 19 are a plurality of arms 26, extending radially from opposite sides of the same and operating close to the inner surface of the closed end of the cage when the shaft is rotated.

One of the side walls of the cage is provided with an aperture 27, having reinforcing-strips 28 29 at the sides, and leading from the strip 28 to a point beyond the shaft 19 is a partition formed of spaced bars 30, the partition forming the guideway into the trap. One of the bars 30 is extended into a hook 31, embracing the shaft 19 to assist in supporting the same.

A lifting handle or bail 32 is connected to the top of the cage.

With a device thus constructed it will be obvious that when an animal enters the aperture 27 and seeks to reach the bait (indicated at 37) the arms 30 will freely yield to pressure in one direction and permit the animal to enter the larger portion of the cage, but will not permit of return movement, as such movement is prevented by the action of the pawl 25 upon the teeth 22.

The device is simple in construction, can be inexpensively manufactured, and will operate effectually for the purposes described.

The strips 28 29 are extended at the lower ends for bearing beneath the bottom 10, as at 33 34, and also extended at the upper ends for bearing over the upper frame 12, as at 35 36, to increase the strength of the structure.

Having thus described the invention, what is claimed is—

In an animal-trap, a cage having an imperforate bottom and with walls and top of wire-netting with one end curved in semicircular form and with an inlet-aperture adjacent to said curved end, sheet-metal binding-strips disposed over the ends of the strands of the wire-netting at the inlet-aperture and forming casings to the same, a plate disposed upon the upper side of said cage, a shaft journaled in said plate and in the imperforate bottom of the cage and disposed concentric to the curved end of the same, a plurality of arms extending radially from said shaft in opposite directions, a partition formed of spaced rods connected at one end to the casing of said inlet and extending to said shaft and a ratchet and pawl the elements of which are connected respectively to said shaft and plate.

In testimony that I claim the foregoing as my own I have hereto affixed my signature in the presence of two witnesses.

JOHN A. MATHEWSON.

Witnesses:
 HENRY SNITZLER,
 R. A. MATHEWSON.